United States Patent [19]

Berg et al.

[11] 3,868,472
[45] Feb. 25, 1975

[54] METHOD OF PRODUCING FAST DISSOLVING DIPEPTIDE SWEETNER FOR SWEET/SOUR SYSTEMS

[75] Inventors: Jeffrey H. Berg, New York; Jerome Trumbetas, Tarrytown, both of N.Y.

[73] Assignee: General Foods Corporation, White Plains, N.Y.

[22] Filed: Apr. 2, 1973

[21] Appl. No.: 347,094

[52] U.S. Cl.............. 426/342, 426/217, 426/289, 426/364
[51] Int. Cl................................ A23l 1/26
[58] Field of Search ...... 426/89, 96, 103, 289, 212, 426/217, 342, 190, 191, 364, 366

[56] References Cited
UNITED STATES PATENTS

| | | | |
|---|---|---|---|
| 3,245,798 | 4/1966 | Van Ness | 426/96 |
| 3,492,131 | 1/1970 | Schlatter | 426/212 |
| 3,622,352 | 11/1971 | Daylor | 426/103 X |
| 3,761,288 | 9/1973 | Glickman et al. | 426/217 X |

FOREIGN PATENTS OR APPLICATIONS 1,177,463  9/1964  Germany ............... 426/217

Primary Examiner—Raymond N. Jones
Assistant Examiner—Esther L. Massung
Attorney, Agent, or Firm—Doris M. Bennett

[57] ABSTRACT

The rate of solution of dipeptide sweetners is increased by co-grinding the dipeptide with an acid in the presence of an organic solvent in which the dipeptide is insoluble.

8 Claims, No Drawings

METHOD OF PRODUCING FAST DISSOLVING DIPEPTIDE SWEETNER FOR SWEET/SOUR SYSTEMS

BACKGROUND OF THE INVENTION

This invention relates to dipeptide sweeteners having improved solubility. More specifically, this invention pertains to the junction of surfaces of dipeptide sweeteners with water soluble acids and the method of effecting the same.

Recently it was found that certain dipeptide compounds possess an intense sweetness. Examples of these compounds are set forth principally in U.S. Pat. No. 3,475,403 issued Oct. 28, 1969 and U.S. Pat. No. 3,492,131 issued Jan. 27, 1970 wherein the significant sweetening properties of the same are presented. Problems have arisen, however, with the use of these compounds in food and beverage systems in that their rate of solution into aqueous media is markedly slower than sucrose. Notwithstanding the attractiveness of the low-calorie sweetening properties of these compounds, it is necessary to improve the solubility characteristics of the same for utility in food and beverage systems. Therefore, this invention is directed to the improved solubility of the dipeptides as herein incorporated by reference with specific allusion to the L-aspartyl-L-phenylalanine methyl ester.

There have been many methods suggested to increase the solubility rate of low solubility compounds within the last few years, principal among them being those methods directed toward improving the solubility of fumaric and adipic acids. These prior efforts have centered about compositions formed by admixing the fumaric and/or adipic acid with additives that have some favorable effect on the solubility rate in water. Exemplary of these types of methods are seen in U.S. Pat. No. 3,011,894 in which fumaric acid is ground to a specific particle size and mixed with either sodium or ammonium chloride in the presence of moisture and U.S. Pat. No. 3,009,811 where adipic acid is ground and subsequently mixed with polyoxyethylene sorbitan stearate or other such polyoxyethylene sorbitan fatty acid esters. Generally speaking however, these methods are specific for fumaric and adipic acids due to their unique insolubility.

It is also known to incorporate a surface active agent subsequent to milling the insoluble material prior to inclusion into a food or beverage system. The surfactant serves to coat the acid particles and thereby renders them more soluble by preventing agglomeration (U.S. Pat. No. 3,351,471 issued Nov. 7, 1976).

Additional reference to the methods of improving the solubility of low solubility compounds is evidenced in U.S. Pat. No. 3,016,299 issued Jan. 9, 1962 which teaches wetting crystalline sugar with a quantity of water insufficient to destroy the crystalline character of all the sugar but sufficient to create a proportion of sugar solution capable of aggregating the insoluble acid powder and undissolved sugar crystals.

A nore recent advance regarding solubility technology is evidenced in U.S. Pat. No. 3,480,444 issued Nov. 25, 1969 concerning cold water solubility of fumaric and adipic acids. Essentially the method involves heating dextrose sufficiently to form a melt, uniformly dispersing the acid into the melt and cooling the melt to effect crystallization of the mixture.

The aforementioned methods of improving solubility of low solubility compounds are useful in a variety of systems. However, in the present invention where it is desired to both retain the sweet taste of the dipeptide and maintain its low caloric content, such methods are unsatisfactory.

SUMMARY OF THE INVENTION

It has been found that dipeptide sweeteners, specifically L-aspartyl-L-phenylalanine methyl ester, exhibit improved solubility when placed in intimate contact with an acid. Explicitly, L-aspartyl-L-phenylalanine methyl ester demonstrates a significantly increased rate of solubility when co-ground with an acid in the presence of an organic solvent in which the dipeptide is insoluble, after which said solvent is evaporated to afford an intimate mixture, this method serving to effectively coat the surface of the low-solubility dipeptide with an enclosing, soluble, transport layer of acid.

Due to the fact that this method involves a type of commingling of the solid acid and dipeptide, there is no chemical interaction between the same i.e. there is no protonation of the dipeptide due to the absence of protons in the dry system and ostensibly no salt formation. Consequently, the dispersibility of the dipeptide is increased while at the same time remaining structurally independent. Essentially, therefore, the rate of solubility of the dipeptide is increased by relying upon the innate solubility of the acid, the acid and dipeptide being in sufficient proportion to one another to permit the acid to coat the dipeptide thereby serving to partially or completely enclose the same in a soluble transport system.

This invention finds unlimited utility in the food and beverage industries for by reason of eliminating the solubility problem of the dipeptide sweeteners, particularly L-aspartyl-L-phenylalanine methyl ester; such sweeteners are suitable for incorporation into consumable products where characteristics lowcaloric content and rapid solubility are desired. As a composite of sweet and sour components, both taste characteristics may be preserved for addition to such systems as fruit flavored punch, "Kool-Aid," candies or the like or the slightly sour property accordingly masked for a totally sweet product. Correspondingly, the acids preferably employed in this invention are those dry acids which are suitable for incorporation into foodstuffs intended for human or animal consumption such as malic acid, citric acid or the like. However, the invention is not circumscribed by the solid food acids as such and is limited only to those dry acids having sine qua non, sufficient solubility.

Accordingly, it is the object of this invention to provide a dipeptide sweetener with improved solubility.

It is another object of this invention to provide an economical means of improving the solubility of the dipeptide.

It is yet another object of this invention to provide a more soluble dipeptide sweetener while maintaining its structural innateness so as to preserve the desirable sweet character of the structurally unmodified dipeptide.

The above and additional objects of this invention are accomplished by intimately associating the dipeptide with a dry acid. The invention comprehends the association of the same with a degree of familiarity such that the dipeptide is coated by the acid, thereby assuming the rapid solubility of the acid while at the same time maintaining its structural uniqueness. The invention is predicated upon the discovery that such participation in solubility is possible by the simple co-grinding of the acid with the sweetener in an organic solvent, the acid and dipeptide being in such proportions as to afford a partial or complete coating of the dipeptide with the acid, the acid thereby functioning as a soluble transport or carrier for the dipeptide. The essentiality of this intimate mixing procedure is evidenced by the fact that the dipeptide and acid placed simultaneously but separately into solution does not demonstrate improved solubility of the dipeptide as compared to the dipeptide in solution by itself.

The features of this invention which are believed to be novel are distinctly set forth and claimed in the concluding portion of this specification.

DESCRIPTION OF THE INVENTION

Since the invention has been summarized in terms of admixture of the dipeptide sweetener, particularly L-aspartyl-L-phenylalanine methyl ester, with a dry acid in the presence of an organic solvent a more detailed explanation, especially with respect to a description of the preferred embodiments in terms of the acids to be used and the proportion by weight of the dipeptide to the acid is given.

L-Aspartyl-L-phenylalanine methyl ester, like its counterparts, possesses a slow rate of dissolution in aqueous systems. By co-grinding mixtures of the sweetener with appropriate levels of dry soluble acids in a volatile, organic solvent, preferably the food acidulants malic acid and citric acid or combinations thereof which are the preferred embodiments of this invention, fast dissolving modifications can be prepared whereby the time required to dissolve a dipeptide sweetener in an aqueous medium is substantially reduced, having a rate of dispersibility in cold water as rapid as that of sucrose. In addition, such a method of solubilizing L-aspartyl-L-phenylalanine affords an overall solubility of about 5 percent as compared to the 1% solubility of L-aspartyl-L-phenylalanine alone in water.

The method of this invention for effecting the quasiencapsulation of L-aspartyl-L-phenylalanine method ester with the acid is herein set forth.

The components of this invention, being in proportion to each other in the range of about 1:2 to about 1:4 weight ratio of sweetener to acid, 1:3 being preferred for better solubility, are co-ground in a volatile organic solvent in which the dipeptide is insoluble for a period of time sufficient to render a partial or complete coating of the sweetener with the acid. Examples of such solvents are chloroform, ether, ethanol or the like, ethanol being preferred among these. The solvent is subsequently evaporated off to afford an intimate mixture. The organic solvent functions both to reduce the electrostatic forces between the container vessel and the ground material therein and in some cases, such as in the case of citric acid which has a slightly soluble character in organic solvents, to partially solubilize the acid thus effecting a more uniform coating of the dipeptide. In all instances, the effect of co-grinding in the presence of the organic solvent allows the acid and dipeptide molecules to come into close contact which is further improved by subsequent evaporation of the solvent. The organic solvent functions in most cases to improve the efficiency of the grinding process and is believed to be the most effective method of achieving an intimate association of the acid and dipeptide without chemically altering the same.

The sweetener/acid blends find application in such systems as cake mixes, pasteries, gelatin desserts, "Kool-Aid," and the like. An organic solvent-ground sweetener/acid preparation with a weight ratio of 1:2 respectively was found to dissolve at 0.07 percent sweetener concentration in cold carbonated water in 25 seconds. Consequently, such blends find utility in carbonated systems as well e.g. carbonated beverages, carbonated candies and the like.

The following examples are given to further illustrate the present invention. The scope of the invention is not, however, meant to be limited to the specific details of the examples.

EXAMPLE I

Malic acid and L-aspartyl-L-phenylalanine methyl ester (1:4 weight ratio of sweetener to acid) were ground together in ethanol using a mortar and pestle for approximately 1 hour. The ethanol was subsequently evaporated off to afford a completely dry mixture.

Approximately 4.5 gms of the mixture was placed in a typical beverage formulation, whereby it comprised approximately 90 percent of the solid formulation of which 1.0 gm or 0.5 percent of the dry mixture was the dipeptide. In comparison to the two min. solubility time of sucrose in the beverage system, the dipeptide commingled with the acid was found to dissolve completely in 25 seconds.

EXAMPLE II

Three samples of L-aspartyl-L-phenylalanine methyl ester were prepared and the following systems evaluated for their solubility, the overall concentration of L-aspartyl-L-phenylalanine methyl ester being in all three instances, 1 percent. The solubility tests were carried out in room temperature water with the same amount of stirring being applied to each sample.

|   |   | $H_2O$/Solubility |
|---|---|---|
| A | L-Aspartyl-L-phenylalanine methyl ester | 4.5 min. |
| B | L-Aspartyl-L-phenylalanine methyl ester + malic acid (1:3 respectively) added separately but simultaneously | 4.25 min. |
| C | L-Aspartyl-L-phenylalanine methyl ester co-ground in ethanol with malic acid (1:3 respectively) | 35 sec. |

What is claimed is:

1. A process for improving the rate of solubility of dipeptide sweeteners which comprise co-grinding the dipeptide with a dry acid in a volatile organic solvent, the dipeptide and acid being in proportion to each other in the range of 1:2 to 1:4 by weight of the dipeptide to the acid and ground for a period of time sufficient to effect at least a partial coating of the dipeptide with the acid, and evaporating off the organic solvent to afford an intimate mixture of dipeptide and acid.

2. The process according to claim 1 wherein the dipeptide and acid are in proportion to each other in a 1:3 weight ratio of dipeptide to acid.

3. The process according to claim 1 wherein the volatile organic solvent is selected from the group consisting of chloroform, ether and ethanol.

4. The process according to claim 3 wherein the volatile organic solvent is ethanol.

5. The process according to claim 4 wherein the dry food acid is citric acid.

6. The process of claim 1 wherein the dipeptide is L-aspartyl-L-phenylalanine methyl ester.

7. The process of claim 1 wherein the dry acids are selected from the group consisting of the dry food acidulants.

8. The process of claim 7 wherein the dry food acidulant is malic acid.

* * * * *

UNITED STATES PATENT OFFICE
CERTIFICATE OF CORRECTION

Patent No. 3,868,472      Dated Feb. 25, 1975

Inventor(s) Jeffrey H. Berg and Jerome Trumbetas

It is certified that error appears in the above-identified patent and that said Letters Patent are hereby corrected as shown below:

In Column 1, line 52, after "Nov. 7," change "1976)." to --1967).--.

In Column 1, line 61, after "A" and before "recent" change "nore" to --more--.

In Column 2, line 39, after "where" and before "content" change "characteristics lowcaloric" to --characteristic low-caloric--.

In Column 3, line 46, before "ester" change "method" to --methyl--.

Signed and sealed this 20th day of May 1975.

(SEAL)
Attest:

RUTH C. MASON
Attesting Officer

C. MARSHALL DANN
Commissioner of Patents
and Trademarks